US006185325B1

(12) United States Patent
Sakaida et al.

(10) Patent No.: US 6,185,325 B1
(45) Date of Patent: Feb. 6, 2001

(54) IMAGE TRANSFORMING METHOD AND APPARATUS

(75) Inventors: Hideyuki Sakaida; Shoji Hara, both of Kanagawa-ken (JP)

(73) Assignee: Fuji Photo Film Co., Ltd., Kanagawa-ken (JP)

( * ) Notice: Under 35 U.S.C. 154(b), the term of this patent shall be extended for 0 days.

(21) Appl. No.: 09/207,401

(22) Filed: Dec. 8, 1998

Related U.S. Application Data (63) Continuation-in-part of application No. 09/108,200, filed on Jul. 1, 1998.

(30) Foreign Application Priority Data

| Jul. 2, 1997 | (JP) | 9-176809 |
| Sep. 9, 1998 | (JP) | 10-255452 |

(51) Int. Cl.$^7$ .................................................. G06K 9/00
(52) U.S. Cl. ........................ 382/162; 382/167; 358/523; 345/431
(58) Field of Search ..................... 382/162, 167, 382/166, 232; 358/518, 520, 523, 524, 525; 348/402, 416; 345/427, 431, 153

(56) References Cited

U.S. PATENT DOCUMENTS

| 5,613,018 | * | 3/1997 | Eldridge | 382/296 |
| 5,787,192 | * | 7/1998 | Takaichi et al. | 382/166 |
| 5,825,785 | * | 10/1998 | Kitsuki | 382/232 |
| 6,061,474 | * | 5/2000 | Kajiwara et al. | 348/411 |
| 6,094,503 | * | 10/1998 | Hara | 382/167 |

* cited by examiner

*Primary Examiner*—Amelia Au
*Assistant Examiner*—Jingge Wu (57) ABSTRACT

A color space is divided into blocks in units of a block having a predetermined size, and transformed values of coordinates of vertexes of each block are calculated and recorded in a transformed value table. In cases where a block having a size different from the predetermined size is contained in the blocks, the block having the different size is replaced by a virtual block, which has a size identical with the predetermined size, and transformed values of coordinates of vertexes of the virtual block are calculated and recorded in a virtual transformed value table. In a factor table, vertexes, which have weight factors other than 0, and the weight factors of these vertexes are recorded with respect to each of positions in a block. A transformed value of a picture element value of each of picture elements, which constitute a color image, is calculated in accordance with the transformed values, which have been recorded in the transformed value table or the virtual transformed value table, and the vertexes and their weight factors recorded in the factor table.

6 Claims, 4 Drawing Sheets

IMAGE TRANSFORMING METHOD AND APPARATUS

This is a Continuation-in-part of application Ser. No. 09/108,200, filed Jul. 1, 1998.

BACKGROUND OF THE INVENTION

1. Field of the Invention

This invention relates to a method and apparatus for transforming a color image. This invention particularly relates to an image transforming method and apparatus, wherein transformed values are calculated previously by carrying out operations with respect to a limited number of values (colors), and a transformed value corresponding to an arbitrary picture element value is calculated by carrying out an interpolating operation on the previously calculated transformed values. This invention also relates to a recording medium, on which the information representing a procedure for image transformation has been recorded.

2. Description of the Prior Art

Color transformation has heretofore been carried out as one kind of digital image processing. For example, in the cases of digital processing of color photographs, if a digital image having been processed for the formation of a print is displayed directly on a monitor, the displayed image will not necessarily look in appropriate colors. Therefore, it is desired that color transformation with a predetermined transformation formula is carried out on the digital image, and thereafter the image obtained from the color transformation is displayed on the monitor.

In the color transformation of a color image, the picture element value of each picture element may be transformed literally by carrying out an operation with a transformation formula. However, such a technique has the problems in that, in cases where the relation formula is a complicated one, the time required to carry out the operation cannot be kept short. Therefore, ordinarily, in systems in which the processing should be carried out quickly as in digital processing of photographs, a technique referred to as the direct mapping process is employed.

In the direct mapping process, transformed values are calculated previously by carrying out accurate operations with respect to a limited number of colors, and the information representing the calculated transformed values is stored in a memory. When an actually inputted value is to be transformed, instead of the accurately operation being carried out, an interpolating operation is carried out by using the previously calculated transformed values, and a transformed value corresponding to the actually inputted value is thereby presumed. Specifically, a multi-dimensional color space is divided into a plurality of blocks, and transformed values are calculated previously by carrying out accurate operations with transformation formulas with respect to coordinates of vertexes of each block. Thereafter, a transformed value corresponding to an arbitrary point is interpolated from the transformed values of the coordinates of the vertexes.

When the interpolating operation is to be carried out, eight vertexes surrounding the inputted picture element value are specified, and the information representing the transformed values of the coordinates of the eight vertexes is read from the memory. The eight vertexes are weighted in accordance with the position of the picture element value in the block. Factors, which represent the weights of the respective vertexes, and the corresponding transformed values, which have been read from the memory, are multiplied by each other, and the thus obtained products are added together. In this manner, the interpolated value is obtained. The interpolating operation is constituted of the simple operations, i.e. the multiplications and the additions. Accordingly, with the interpolating operation, the processing can be carried out more quickly than with the technique in which the operation with a transformation formula is carried out.

In the technique described above, eight times of multiplications and seven times of additions (i.e., the adding of eight values) are necessarily carried out for one time of interpolating operation. However, in cases where the inputted picture element value is the one located at a point on a surface or a line of the block, the weight factors of the vertexes other than the vertexes, which constitute the surface or the line of the block, become 0. Therefore, in such cases, actually, it is unnecessary for the multiplications to be carried out with respect to the weight factors of the vertexes other than the vertexes constituting the surface or the line of the block.

Also, in the technique described above, the weight factors are calculated each time a picture element value is inputted. However, actually, in cases where the relative position in a block is the same, the weight factors of the vertexes do not vary. Therefore, the technique described above has the drawbacks in that the weight factors are calculated many times with respect to the same pattern.

SUMMARY OF THE INVENTION

The primary object of the present invention is to provide an image transforming method, wherein useless processing in a direct mapping technique is eliminated, and image transformation processing is carried out quickly such that no error may occur.

Another object of the present invention is to provide an apparatus for carrying out the image transforming method.

A further object of the present invention is to provide a recording medium, on which the information representing a procedure for image transformation has been recorded.

The present invention provides an image transforming method, in which a first picture element value of each of picture elements constituting a color image is replaced by a second picture element value that is set to have correspondence to the first picture element value by a predetermined transformation formula, the method comprising:

dividing a multi-dimensional color space into a plurality of blocks in units of a block having a predetermined size, carrying out an operation with the transformation formula with respect to coordinates of each of vertexes of each block, transformed values of the coordinates of vertexes of each block being thereby calculated previously, and carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, the second picture element value being thereby calculated, wherein the improvement comprises the steps of:

i) in cases where a block having a size different from the predetermined size is contained in the plurality of the blocks, replacing the block having the different size by a virtual block, which has a size identical with the predetermined size, transformed values of coordinates of vertexes of the virtual block being then calculated from the transformed values of the coordinates of the vertexes of the block having the different size, ii) previously storing information, which represents a transformed value table, and information, which represents a factor table, in a memory, the transformed value table recording the transformed values of the coordinates of the vertexes with respect to each of the blocks, including the virtual block, the factor table recording vertexes, which have weight factors other than 0, and the weight factors of the vertexes, which have weight factors other than 0, with respect to each of positions in a block, and iii) carrying out the interpolating operation by utilizing only the vertexes, which have weight factors other than 0, and in accordance with the transformed values, which have been recorded in the transformed value table, and the vertexes and their weight factors, which have been recorded in the factor table.

In the image transforming method in accordance with the present invention, the picture element value is the one represented by (R, G, B). Also, the multi-dimensional color space is the coordinate space, which have R, G, and B axes and visually represents the picture element value (color) as a coordinate point.

As for the weight factor, for example, in cases where a certain picture element value is located at the middle point between a vertex "a" and a vertex "b," the weight factor of the vertex "a" is ½, and the weight factor of the vertex "a" is ½. In cases where a certain picture element value is located at a point dividing the line, which connects the vertex "a" and the vertex "b," in a ratio of 1:2 (at a point closer to the vertex "a"), the weight factor of the vertex "a" is ⅓, and the weight factor of the vertex "b" is ⅓. Specifically, the weight factor is determined in accordance with the relationship between the position of the picture element value and the positions of the vertexes, i.e. the position of the picture element value in the block, regardless of the coordinate values of the vertexes. Therefore, in cases where the sizes of the blocks are identical with one another, with respect to only one block, the weight factors may be calculated with respect to every point, which is contained in the block. In such cases, the calculated weight factors can be applied also to picture element values located in the other blocks.

As a result of the division of the multi-dimensional color space into the plurality of blocks in units of the block having the predetermined size, the block having a size different from the predetermined size may occur. In such cases, the block having the different size is replaced by the virtual block, which has a size identical with the predetermined size, and the transformed values of the coordinates of the vertexes of the virtual block are calculated from the transformed values of the coordinates of the vertexes of the block having the different size. In this manner, as for the block having the different size, the transformation can be carried out in the same manner as that for the transformation with respect to the block having the predetermined size. Therefore, useless processing in the direct mapping technique can be eliminated. Also, the image transformation processing can be carried out quickly and such that no error may occur.

The term "in a block" as used herein embraces the boundary lines, boundary surfaces, and vertexes of the block.

Therefore, for example, in cases where the block is a cube having a size of 8 picture elements×8 picture elements×8 picture elements, the factor table recording vertexes, which have weight factors other than 0, and the weight factors of the vertexes, which have weight factors other than 0, with respect to each of positions in a block is composed of 512 pieces of data.

No limitation is imposed upon the size of the block. If the block size is set to be large, the number of points in the block will become large, and therefore the factor table will become large. If the block size is set to be small, the number of vertexes will become large, and therefore the amount of operations, which are carried out previously in order to calculate transformed values, will become large. Therefore, an appropriate block size may be selected by considering the memory capacity and the amount of operations.

In order for the vertexes, which have weight factors other than 0, to be recorded in the factor table, names according to relative positions of the vertexes may be given to the vertexes. For example, a name "a" may be given to the vertex, which is closest to the origin of the color space. The names of the vertexes may be recorded in the factor table. Alternatively, each of the vertexes may be represented by unit coordinates with the length of one side of the block being taken as 1, and the vertexes may be recorded as (0, 0, 0), (1, 0, 0), (0, 1, 0), and so on.

Further, a vertex data sequence, which is formed by arraying the vertexes of a single block in the adjoining order, may be stored in the memory, and each of the vertexes, which have weight factors other than 0, may be represented by the number of the vertexes and a pointer indicating a portion in the vertex data sequence, at which the vertexes are arrayed consecutively.

The present invention also provides an image transforming apparatus, in which a first picture element value of each of picture elements constituting a color image is replaced by a second picture element value that is set to have correspondence to the first picture element value by a predetermined transformation formula, the apparatus comprising:

a transformation means for obtaining information representing coordinates of vertexes of a plurality of blocks, into which a multi-dimensional color space has been divided in units of a block having a predetermined size, carrying out an operation with the transformation formula with respect to the coordinates of each of the vertexes of each block, and thereby calculating transformed values of the coordinates of vertexes of each block, a storage means for storing information representing the transformed values having been calculated by the transformation means, and an interpolating operation means for carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, and thereby calculating the second picture element value, wherein the apparatus further comprises a generation means operating such that, in cases where a block having a size different from the predetermined size is contained in the plurality of the blocks, the generation means may replace the block having the different size by a virtual block, which has a size identical with the predetermined size, and the generation means may then generate transformed values of coordinates of vertexes of the virtual block from the transformed values of the coordinates of the vertexes of the block having the different size, the storage means stores information, which represents a transformed value table, and information, which represents a factor table, the transformed value table recording the transformed values of the coordinates of the vertexes with respect to each of the blocks, including the virtual block, the factor table recording vertexes, which have weight factors other than 0, and the weight factors of the vertexes, which have weight factors other than 0, with respect to each of positions in a block, and the interpolating operation means carries out the interpolating operation by utilizing only the vertexes, which have weight factors other than 0, and in accordance with the transformed values, which have been recorded in the transformed value table stored in the storage means, and the vertexes and their weight factors, which have been recorded in the factor table stored in the storage means.

In the image transforming apparatus in accordance with the present invention, the storage means may further store information representing a vertex data sequence, which is formed by arraying the vertexes of a single block in the adjoining order, and may store the information representing each of the vertexes, which have weight factors other than 0, as a combination of the number of the vertexes and a pointer indicating a portion in the vertex data sequence, at which the vertexes are arrayed consecutively.

The present invention further provides a recording medium, on which a program for causing a computer to execute image transformation processing has been recorded, the image transformation processing being carried out for replacing a first picture element value of each of picture elements, which constitute a color image, by a second picture element value that is set to have correspondence to the first picture element value by a predetermined transformation formula, the image transformation processing comprising:

a first step for dividing a multi-dimensional color space into a plurality of blocks in units of a block having a predetermined size, carrying out an operation with the transformation formula with respect to coordinates of each of vertexes of each block, and thereby calculating transformed values of the coordinates of vertexes of each block, and a second step for carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, and thereby calculating the second picture element value, the first picture element value being replaced by the second picture element value, image transformation being thereby carried out, wherein the improvement comprises:

i) in the first step, in cases where a block having a size different from the predetermined size is contained in the plurality of the blocks, replacing the block having the different size by a virtual block, which has a size identical with the predetermined size, transformed values of coordinates of vertexes of the virtual block being then calculated from the transformed values of the coordinates of the vertexes of the block having the different size, ii) previously storing information, which represents a transformed value table, and information, which represents a factor table, in a memory, the transformed value table recording the transformed values of the coordinates of the vertexes with respect to each of the blocks, including the virtual block, the factor table recording vertexes, which have weight factors other than 0, and the weight factors of the vertexes, which have weight factors other than 0, with respect to each of positions in a block, and iii) in the second step, carrying out the interpolating operation by utilizing only the vertexes, which have weight factors other than 0, and in accordance with the transformed values, which have been recorded in the transformed value table, and the vertexes and their weight factors, which have been recorded in the factor table.

With the image transforming method, the image transforming apparatus, and the recording medium, on which the information representing a procedure for image transformation has been recorded, in accordance with the present invention, the interpolating operation is carried out by making reference to the transformed value table, which records the transformed values of the coordinates of the vertexes necessary for the interpolating operation, and the factor table, which records the weight factors of the vertexes. Therefore, unnecessary operations with respect to vertexes, which have a weight factor of 0, need not be repeated. Also, the calculations of the weight factors need not be carried out each time a picture element value is inputted. As a result, the processing can be carried out quickly. In such cases, the operation processing carried out is only the product sum operation. Therefore, the image transforming method, the image transforming apparatus, and the recording medium, on which the information representing a procedure for image transformation has been recorded, in accordance with the present invention are also suitable for pipeline processing.

Further, when the transformed values of the coordinates of the vertexes necessary for the interpolating operation are calculated, the multi-dimensional color space is divided into the plurality of the blocks in units of a block having a predetermined size. In cases where a block having a size different from the predetermined size is contained in the plurality of the blocks, the block having the different size is replaced by the virtual block, which has a size identical with the predetermined size, and the transformed values of the coordinates of the vertexes of the virtual block are then calculated from the transformed values of the coordinates of the vertexes of the block having the different size. The image transformation can thereby be carried out. Therefore, transformation errors can be prevented from occurring in the image transformation.

As described above, with the image transforming method, the image transforming apparatus, and the recording medium, on which the information representing a procedure for image transformation has been recorded, in accordance with the present invention, useless processing in the direct mapping technique can be eliminated, and the image transformation processing can be carried out quickly such that no error may occur.

DESCRIPTION OF THE PREFERRED EMBODIMENTS

Figure 1:
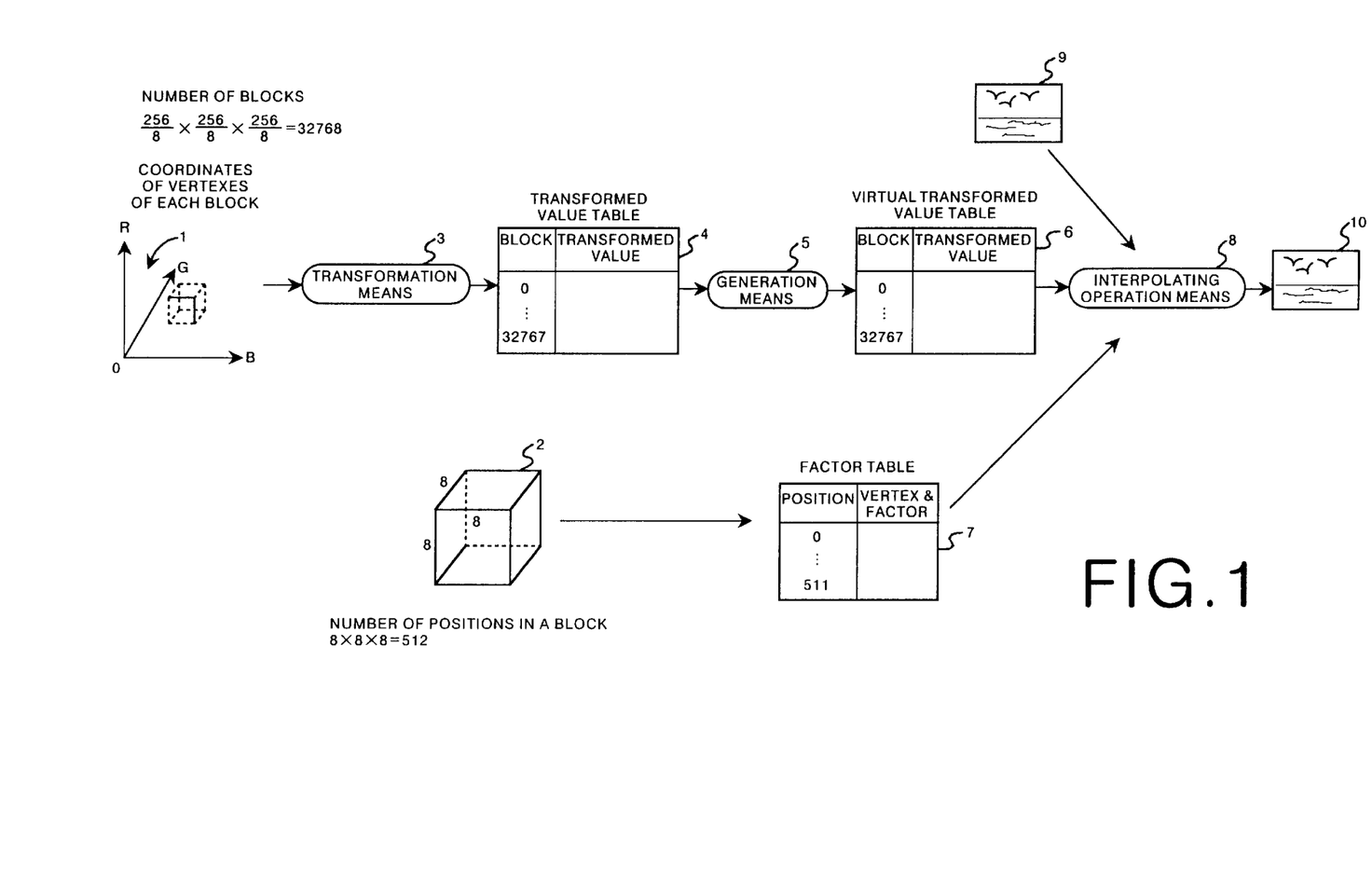
FIG. 1 is an explanatory view showing an embodiment of the image transforming method in accordance with the present invention.
Figure 2:
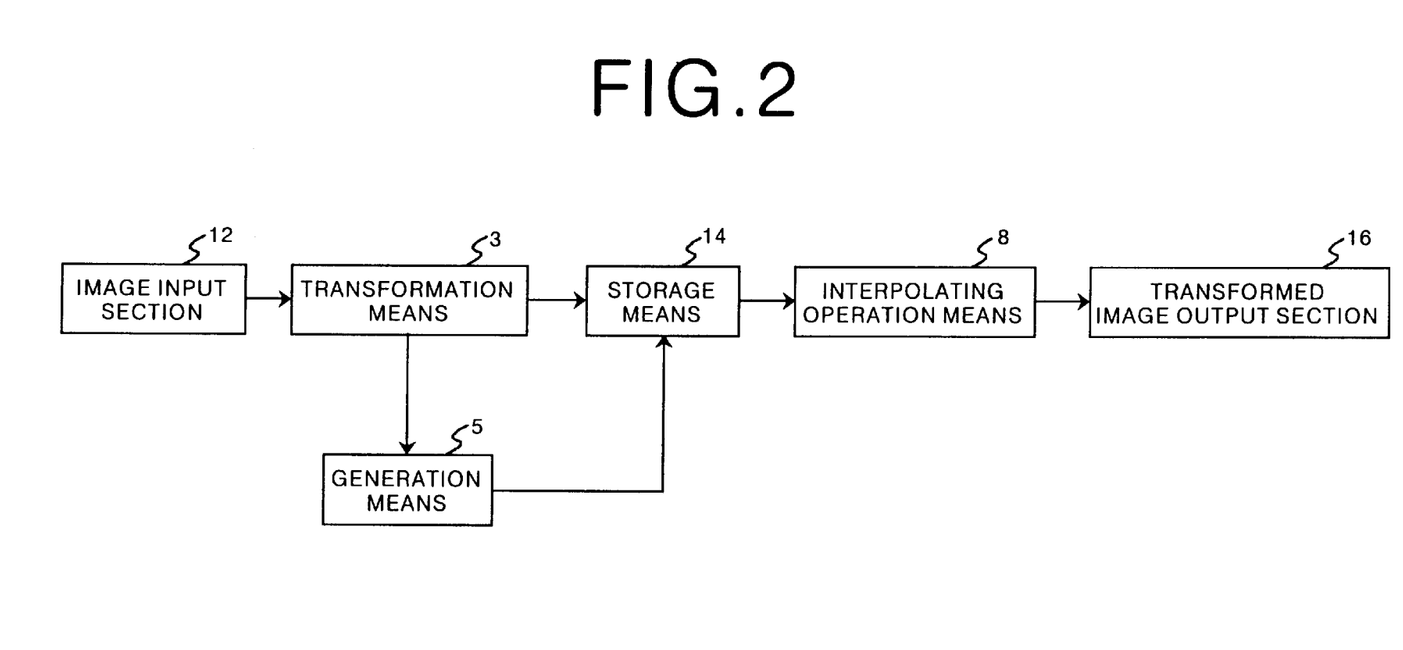
FIG. 2 is a block diagram showing an embodiment of the image transforming apparatus in accordance with the present invention.

The present invention will hereinbelow be described in further detail with reference to the accompanying drawing. FIG. 1 is an explanatory view showing an embodiment of the image transforming method in accordance with the present invention. FIG. 2 is a block diagram showing an embodiment of the image transforming apparatus in accordance with the present invention, in which the image transformation is carried out with the embodiment of the image transforming method in accordance with the present invention.

As illustrated in FIG. 1, in the embodiment of the image transforming method in accordance with the present invention, a transformed value table 4, virtual transformed value table 6, and a factor table 7 are prepared previously. When an image signal representing a color image 9 is inputted, an interpolating operation is carried out by making reference to the values having been recorded in the transformed value table 4, the virtual transformed value table 6, and the factor table 7. A transformed image 10 is thereby formed. As illustrated in FIG. 2, an embodiment of the image transforming apparatus in accordance with the present invention, in which the image transformation is carried out with the embodiment of the image transforming method in accordance with the present invention, comprises an image input section 12, a transformation means 3, a generation means 5, a storage means 14, an interpolating operation means 8, and an transformed image output section 16.

Firstly, how the transformed value table 4, which records information representing transformed values having been calculated by the transformation means 3, is prepared and the contents recorded therein will be described hereinbelow. A color space 1 is a three-dimensional coordinate space having R, G, and B axes. Each of coordinate points in the color space 1 represents one color. In the cases of a full color image, each of the R, G, and B takes values of 0 to 255. Therefore, $256^3$ (=16,777,216) points representing the colors are present in the color space 1. In this embodiment, the color space 1 is divided into blocks 2, 2, . . . each having a size of 8×8×8, and accurate operations with transformation formulas are carried out by a transformation means 3 with respect to only the coordinates of vertexes of the blocks 2, 2, . . . At this time, the number of the vertexes is $(256/8)^3$ = 32,768. Since the number of points subjected to the accurate operations is thus comparatively small, even if the transformation formulas are comparatively complicated ones, the operations can be carried out quickly with a computer.

The thus obtained transformed values of the coordinates of the vertexes of each block are described as a single piece of data in the transformed value table 4. Specifically, as shown in Table 1 below, each piece of data in the transformed value table is composed of nine elements, i.e. block No. for specifying a block and eight transformed values (RGB coordinate values). For example, since vertexes of adjacent blocks have the same coordinates, the same transformed value is stored repeatedly as the elements of a plurality of pieces of data. However, the image transforming method in accordance with the present invention is the one which gives priority to the quick processing over the memory use efficiency. Therefore, the data structure described above is employed by considering the efficiency, with which the table is referred to.

TABLE 1

| | Transformed value table | | | |
|---|---|---|---|---|
| BLOCK | TRANS-FORMED VALUE 1 | TRANS-FORMED VALUE 2 | ... | TRANS-FORMED VALUE 8 |
| 0 | $R_{0-1}\ G_{0-1}\ B_{0-1}$ | $R_{0-2}\ G_{0-2}\ B_{0-2}$ | ... | $R_{0-8}\ G_{0-8}\ B_{0-8}$ |
| 1 | $R_{1-1}\ G_{1-1}\ B_{1-1}$ | $R_{1-2}\ G_{1-2}\ B_{1-2}$ | ... | $R_{1-8}\ G_{1-8}\ B_{1-8}$ |
| 2 | $R_{2-1}\ G_{2-1}\ B_{2-1}$ | $R_{2-2}\ G_{2-2}\ B_{2-2}$ | ... | $R_{2-8}\ G_{2-8}\ B_{2-8}$ |
| : | : | : | | : |
| 32767 | $R_{32767-1}\ G_{32767-1}\ B_{2-1}$ | $R_{32767-2}G_{32767-2}\ B_{32767-2}$ | ... | $R_{32767-8}G_{32767-8}\ B_{32767-8}$ |

How the factor table 7, which is to be stored previously in the storage means 14, is prepared and the contents recorded therein will be described hereinbelow. As described above, in this embodiment, one block has the size of 8×8×8, and therefore 512 coordinate points (colors) are present in the block (containing the boundary). The transformed value of each color is calculated by carrying out an interpolating operation by using the transformed values of the coordinates of the vertexes. With the conventional direct mapping technique, weight factors necessary for the interpolating operation have been calculated each time the interpolating operation is carried out. On the other hand, with the image transforming method in accordance with the present invention, the weight factors are recorded previously in the factor table 7. Specifically, instead of the weight factors for all of the vertexes being recorded, only the weight factors used for the interpolating operation are recorded in the factor table 7. Also, since the weight factors are determined by a position in the block, pieces of data in a number equal to the number of the coordinate points contained in one block (512 pieces) may be stored. Table 2 below shows an example of the factor table 7.

TABLE 2

| | Factor table | | | | | |
|---|---|---|---|---|---|---|
| PAT-TERN | NUMBER OF VER-TEXES | START POSI-TION | FACTOR 1 | FACTOR 2 | ... | FACTOR 8 |
| 0 | 1 | ⑧ | 1 | — | — | — |
| 1 | 2 | ① | ⅛ | ⅞ | — | — |
| 2 | 2 | ① | ¼ | ¾ | — | — |
| : | : | : | : | : | | : |
| 5 1 1 | : | : | : | : | | : |

| VERTEX DATA SEQUENCE |
| --- |
| ① (1, 0, 0) |
| ② (0, 0, 0) |
| ③ (0, 0, 1) |
| ④ (1, 0, 1) |
| ⑤ (1, 0, 0) |
| ⑥ (1, 1, 0) |
| ⑦ (0, 1, 0) |
| ⑧ (0, 0, 0) |
| ⑨ (0, 0, 1) |
| ⑩ (0, 1, 1) |
| ⑪ (1, 1, 1) |

In Table 2, the term "pattern" represents the number for the identification of a position in the block. The term "number of vertexes" used in Table 2 represents the number of the vertexes, which are used for the interpolating operation. For example, in cases where the picture element value is the one corresponding to the coordinates of a vertex, the operation can be carried out by using only the values of the single vertex. In cases where the picture element value is the one located at a point on a boundary line of the block, the interpolating operation can be carried out by using only the transformed values of the coordinates of two vertexes. Also, in cases where the picture element value is the one located at a point on a boundary surface of the block, the interpolating operation can be carried out by using only the transformed values of the coordinates of four vertexes. If the number of the vertexes, which are necessary for the interpolating operation, is known previously, the processing can be finished at the time at which the same number of times of operations as the number of the vertexes necessary for the interpolating operation have been carried out. Therefore, useless processing, such as that the transformed values of the coordinates of vertexes are multiplied by a weight factor of 0, can be eliminated.

In cases where the number of the vertexes, which are necessary for the interpolating operation, is smaller than eight, which vertexes are to be used for the interpolating operation must be specified in the factor table. In this embodiment, a vertex data sequence, which is formed by arraying the vertexes of a single block in the adjoining order such that adjacent vertexes may be arrayed consecutively (i.e., in the order such that the vertexes can be traced with one stroke of a brush), is defined previously. Also, in the factor table 7, as the "start position," a pointer indicating a portion in the vertex data sequence, at which the vertexes to be used for the interpolating operation are arrayed consecutively, is recorded. The vertexes specified in the vertex data sequence may be represented by relative values for discriminating the vertexes of the block from one another. Therefore, in the example of Table 2, the vertexes are represented by the unit coordinates as (0, 0, 0), (1, 0, 0), and so on.

Figure 3:
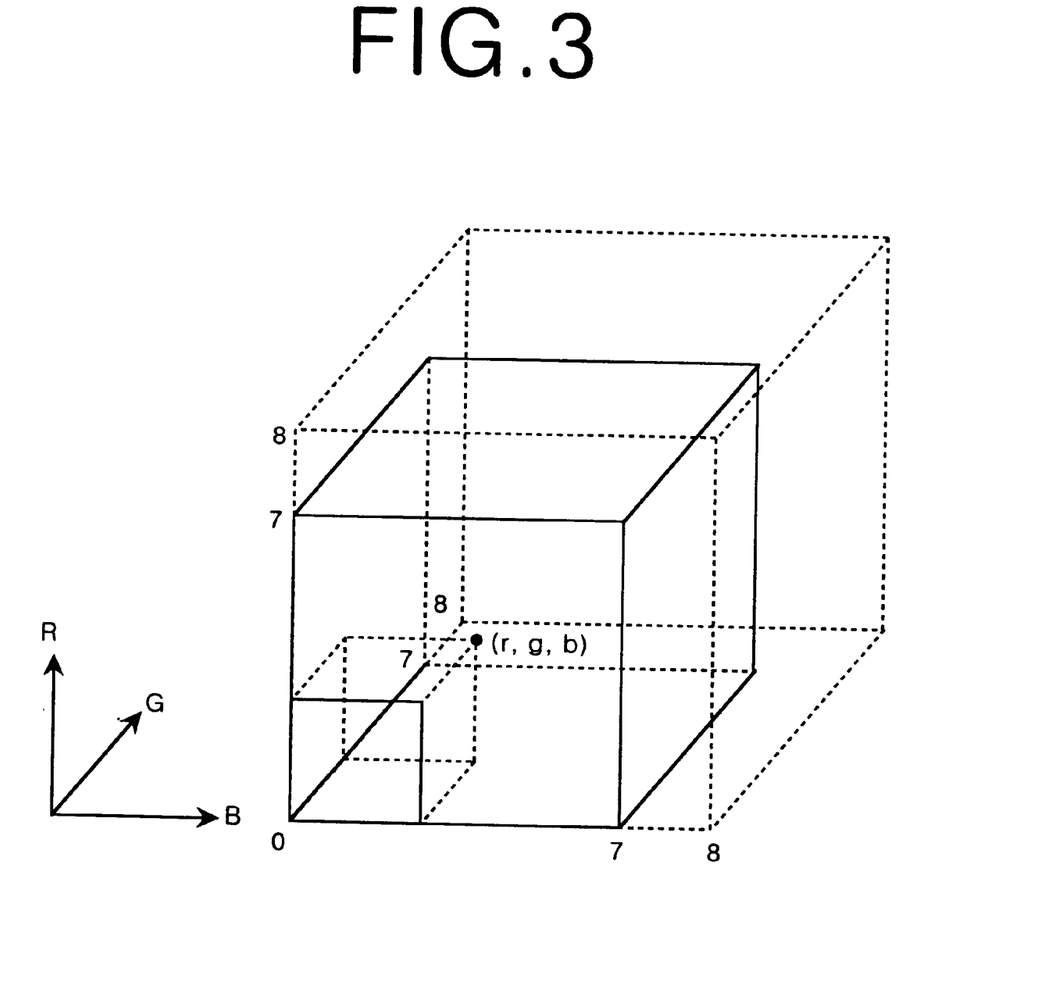
FIG. 3 is an explanatory view showing a virtual block, which is formed for generation of virtual transformed values in the embodiment of the image transforming method in accordance with the present invention.

However, in the example described above, each of the color components (i.e., the R component, the G component, and the B component) takes values of 0 to 255. In cases where the blocks are formed at intervals of 8, the vertexes of the blocks take coordinate values of 0, 8, 16, . . . , 248, and 255. Therefore, in cases where the blocks are formed at intervals of 8, the last block has a size of 7. If the block having a size of 7 is processed as the block having a size of 8, errors will occur. As illustrated in FIG. 3, in the embodiment of the image transforming method in accordance with the present invention, in order for the errors to be eliminated, a virtual block having a size of 8 is formed with respect to the block having a size of 7, such that the sizes of all blocks may become identical with one another. The generation means 5 thereby generates the virtual transformed value table 6. The virtual transformed value table 6 records the information representing the transformed values, which are generated by the generation means 5. The virtual transformed value table 6 is stored in the storage means 14.

How the virtual transformed value table 6 is prepared and the contents recorded therein will be described hereinbelow.

In FIG. 3, the transformed values at the vertexes of the cube having a size of 8×8×8 may be determined to be R(0, 0, 0)G(0, 0, 0)B(0, 0, 0), R(0, 0, 8)G(0, 0, 8)B(0, 0, 8), . . . , R(8, 8, 8)G(8, 8, 8)B(8, 8, 8). In such cases, the R, G, and B values at an interpolation point having coordinates (r, g, b) are determined with Formulas (1), (2), and (3) shown below.

$$R(r, g, b) = \{(8-r)(8-g)(8-b)R(0, 0, 0) + \\ (8-r)(8-g)bR(0, 0, 8) + (8-r)g(8-b)R(0, 8, 0) + \\ r(8-g)(8-b)R(8, 0, 0) + (8-r)gbR(0, 8, 8) + \\ rg(8-b)R(8, 8, 0) + r(8-g)bR(8, 0, 8) + rgbR(8, 8, 8)\} \div 8^3 \quad (1)$$

$$G(r, g, b) = \\ \{(8-r)(8-g)(8-b)G(0, 0, 0) + (8-r)(8-g)bG(0, 0, 8) + \\ (8-r)g(8-b)G(0, 8, 0) + r(8-g)(8-b)G(8, 0, 0) + \\ (8-r)gbG(0, 8, 8) + rg(8-b)G(8, 8, 0) + \\ r(8-g)bG(8, 0, 8) + rgbG(8, 8, 8)\} \div 8^3 \quad (2)$$

$$B(r, g, b) = \{(8-r)(8-g)(8-b)B(0, 0, 0) + \\ (8-r)(8-g)bB(0, 0, 8) + (8-r)g(8-b)B(0, 8, 0) + \\ r(8-g)(8-b)B(8, 0, 0) + (8-r)gbB(0, 8, 8) + \\ rg(8-b)B(8, 8, 0) + r(8-g)bB(8, 0, 8) + rgbB(8, 8, 8)\} \div 8^3 \quad (3)$$

In the manner described above, a three-dimensional linear interpolating operation is employed as the technique for the color transformation.

In cases where the cube has a size of 7×7×7, transformed values at the vertexes of a cube having a size of 8×8×8 are calculated from the transformed values at the vertexes of the cube having a size of 7×7×7 by utilizing linear extrapolation shown below.

$$R(0, 0, 0) = R(0, 0, 0) \quad (4)$$

$$R(0, 0, 8) = \{-R(0, 0, 0) + 8R(0, 0, 7)\} \div 7 \quad (5)$$

$$R(0, 8, 0) = \{-R(0, 0, 0) + 8R(0, 7, 0)\} \div 7 \quad (6)$$

$$R(8, 0, 0) = \{-R(0, 0, 0) + 8R(7, 0, 0)\} \div 7 \quad (7)$$

$$R(0, 8, 8) = \{R(0, 0, 0) - 8R(0, 0, 7) - 8R(0, 7, 0) + 64R(0, 7, 7)\} \div 7^2 \quad (8)$$

$$R(8, 0, 8) = \{R(0, 0, 0) - 8R(0, 0, 7) - 8R(7, 0, 0) + 64R(7, 0, 7)\} \div 7^2 \quad (9)$$

$$R(8, 8, 0) = \{R(0, 0, 0) - 8R(0, 7, 0) - 8R(7, 0, 0) + 64R(7, 7, 0)\} \div 7^2 \quad (10)$$

$$R(8, 8, 8) = \{-R(0, 0, 0) + 8R(0, 0, 7) + 8R(0, 7, 0) + 8R(7, 0, 0) - \\ 64R(0, 7, 7) - 64R(7, 0, 7) - 64R(7, 7, 0) + 512R(7, 7, 7)\} \div 7^3 \quad (11)$$

(As for the G and B, calculations may be made in the same manner.)

When calculations are made with Formulas (1), (2), and (3) in accordance with the transformed values at the vertexes of the virtual cube having the size of 8×8×8, which have been calculated with Formulas (4) through (11) shown above, the results represented by Formulas (12), (13), and (14) shown below are obtained.

$$R(r, g, b) = \quad (12)$$
$$\{(7-r)(7-g)(7-b)R(0,0,0) + (7-r)(7-g)bR(0,0,7) +$$
$$(7-r)g(7-b)R(0,7,0) + r(7-g)(7-b)R(7,0,0) +$$
$$(7-r)gbR(0,7,7) + rg(7-b)R(7,7,0) +$$
$$r(7-g)bR(7,0,7) + rgbR(7,7,7)\} \div 7^3$$

$$G(r, g, b) = \quad (13)$$
$$\{(7-r)(7-g)(7-b)G(0,0,0) + (7-r)(7-g)bG(0,0,7) +$$
$$(7-r)g(7-b)G(0,7,0) + r(7-g)(7-b)G(7,0,0) +$$
$$(7-r)gbG(0,7,7) + rg(7-b)G(7,7,0) +$$
$$r(7-g)bG(7,0,7) + rgbG(7,7,7)\} \div 7^3$$

$$B(r, g, b) = \quad (14)$$
$$\{(7-r)(7-g)(7-b)B(0,0,0) + (7-r)(7-g)bB(0,0,7) +$$
$$(7-r)g(7-b)B(0,7,0) + r(7-g)(7-b)B(7,0,0) +$$
$$(7-r)gbB(0,7,7) + rg(7-b)B(7,7,0) +$$
$$r(7-g)bB(7,0,7) + rgbB(7,7,7)\} \div 7^3$$

Formulas (12), (13), and (14) are the same as the 7×7×7 three-dimensional linear interpolating operations. Thus, in cases where the coordinates of the virtual vertexes are determined as with Formulas (4) through (11), accurate interpolating operations can be carried out with Formulas (1), (2), and (3). Therefore, transformation errors can be prevented from occurring.

Formulas (4) through (11) shown above are for the cases wherein the cube has a size of 7×7×7. It will often be necessary to consider vertexes of a rectangular parallelepiped having a size of, for example, 7×7×8 or 7×8×8. In such cases, extrapolating operations may be carried out in the same manner, and transformed values at the vertexes of the virtual cube having a size of 8×8×8 can thereby be obtained.

In the example described above, the virtual transformed value table with respect to the vertexes of the blocks taking coordinate values of 0, 8, 16, . . . , 248, and 256 is calculated from the transformed value table with respect to the vertexes of the blocks taking coordinate values of 0, 8, 16, . . . , 248, and 255. In cases where a virtual transformed value table with respect to the vertexes of the blocks taking coordinate values of 255, 247, . . . , 7, and −1 is to be calculated from a transformed value table with respect to the vertexes of the blocks taking coordinate values of 255, 247, . . . , 7, and 0, calculations may be made in the same manner as that described above.

Figure 4:
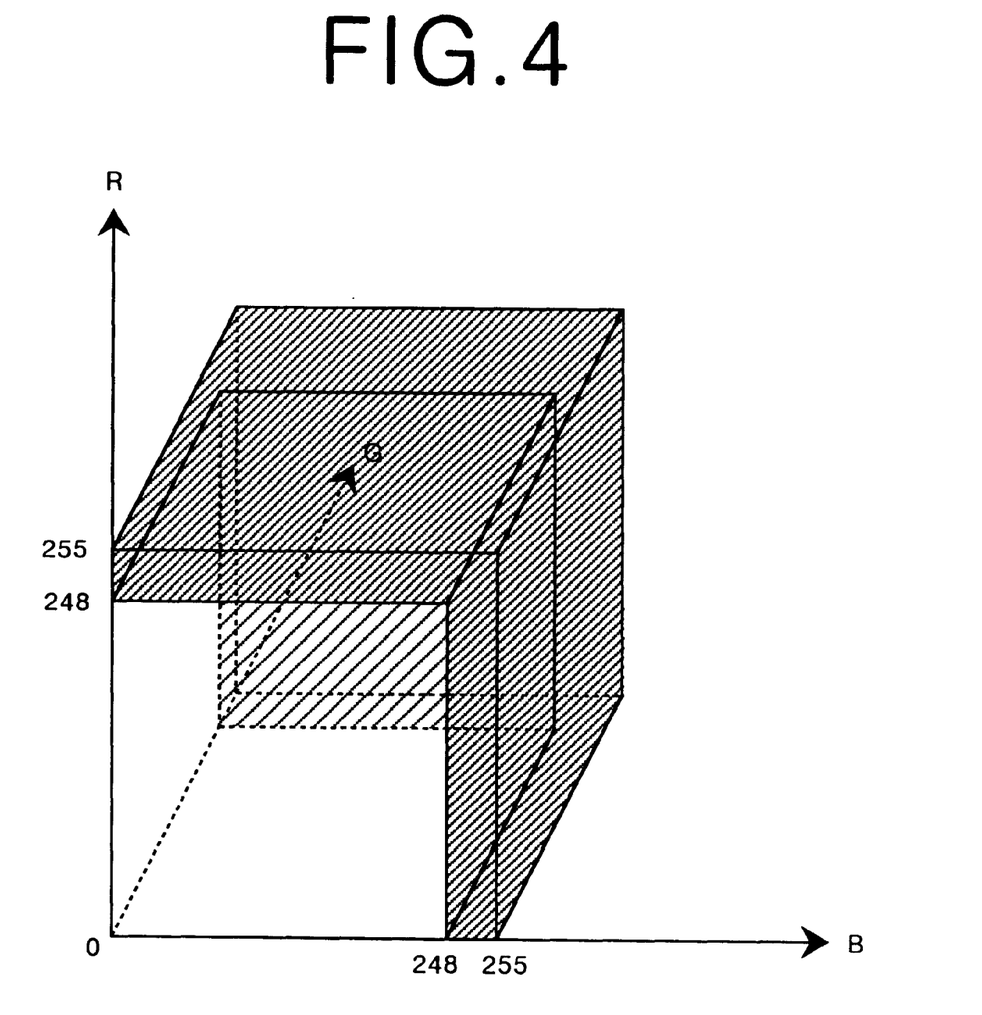
FIG. 4 is an explanatory view showing a position of a color space, for which virtual transformation is necessary in the embodiment of the image transforming method in accordance with the present invention.

In the example described above, the region, for which the extrapolating operation is necessary in the transformation from the transformed value table 4 into the virtual transformed value table 6 that is generated by the generation means 5, is the region hatched in FIG. 4. The 7×7×7-to-8×8×8 three-dimensional extrapolation is not necessary for all blocks. Specifically, extrapolating operations shown below are necessary.

7×7×7-to-8×8×8:
  three-dimensional extrapolation . . . 1 block
7×7×8-to-8×8×8:
  two-dimensional extrapolation . . . 93 blocks
7×8×8-to-8×8×8:
  one-dimensional extrapolation . . . 2,883 blocks The calculation of the virtual transformed value table made by the generation means 5 may be carried out only one time. Therefore, the time required for the calculation can be kept short.

The virtual transformed value table 6, which is generated by the generation means 5, is used in cases where the block having a size different from the predetermined size is contained in the plurality of the blocks, into which the color space has been divided in units of a block having the predetermined size. In cases where the block having a size different from the predetermined size is not contained in the plurality of the blocks, the virtual transformed value table 6 need not be generated.

The transformed value table 4, the virtual transformed value table 6, and the factor table 7 are prepared in the manner described above. How the processing for replacing the picture element value by making reference to the transformed value table 4, the virtual transformed value table 6, and the factor table 7 (i.e., the processing with the interpolating operation means 8) is carried out will be described hereinbelow.

When the image signal representing the color image 9 is inputted into the image input section 12, the interpolating operation means 8 carries out the processing described below with respect to the picture element value of each picture element in the color image 9. Firstly, the block No. of the block, to which the picture element value belongs in the color space 1 having been divided into the plurality of blocks in units of a block having the predetermined block size, is detected by the transformation means 3. The data of the block having the detected block No. is then retrieved from the transformed value table 4, and the information representing the transformed values of the vertexes of the block (i.e., the vertexes surrounding the inputted picture element value) is read and stored in the storage means 14.

Also, in cases where the block having the detected block No. is the one having a size different from the predetermined block size, in the generation means 5, the block having the different size is replaced by the virtual block, which has a size identical with the predetermined size, and the transformed values of the coordinates of the vertexes of the virtual block are calculated. The information representing the transformed values having been calculated for the virtual block is recorded in the virtual transformed value table 6. Thereafter, the data of the block is retrieved from the virtual transformed value table 6, and the information representing the transformed values of the vertexes of the block (i.e., the vertexes surrounding the inputted picture element value) is read.

Thereafter, the position of the picture element value in the block is calculated, and the data of the calculated position is retrieved from the factor table 7, which has been stored previously in the storage means 14. The number of the vertexes, the start position, and the weight factors are thus read. Also, the transformed value corresponding to the coordinates of the vertex, which is indicated by the start position in the vertex data sequence, (i.e., the transformed value having been read from the transformed value table 4 or the virtual transformed value table 6) and the weight factor of the vertex (the weight factor having been read from the factor table 7) are multiplied by each other. In cases where the number of the vertexes is two or larger, the transformed value corresponding to the coordinates of the vertex, which is next to the start position in the vertex data sequence, and the weight factor of the vertex are multiplied by each other, and the same number of times of operations as the number of the vertexes are carried out. Thereafter, all of the results of the multiplications are integrated, and an interpolated picture element value is thereby obtained. Finally, the picture element value of the color image 9 is replaced by the thus obtained picture element value. The processing is carried out for each of the picture elements constituting the color image 9, and a transformed image of the color image 9 is outputted by the transformed image output section 16. The transformed image 10 is thereby obtained.

With the embodiment described above, the image transformation can be carried out with a processing time as short as approximately one-third of the processing time with the conventional direct mapping technique. Thus the embodiment described above has large practical effects.

In the embodiment described above, the color space is divided into cubic blocks. Alternatively, the color space may be divided into triangular prism-shaped blocks, triangular pyramid-shaped blocks, or the like.

The procedure for the aforesaid image transformation employed in the embodiment described above may be recorded on a recording medium, such as a floppy disk or a hard disk, as a program for causing a computer to execute the procedure. The procedure may thereby be read by a computer, and the image transformation may thus be carried out by the computer.

What is claimed is:

1. An image transforming method, in which a first picture element value of each of picture elements constituting a color image is replaced by a second picture element value that is set to have correspondence to the first picture element value by a predetermined transformation formula, the method comprising:

dividing a multi-dimensional color space into a plurality of blocks in units of a block having a predetermined size, carrying out an operation with the transformation formula with respect to coordinates of each of vertexes of each block, transformed values of the coordinates of vertexes of each block being thereby calculated previously, and carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, the second picture element value being thereby calculated, wherein the improvement comprises the steps of:

i) in cases where a block having a size different from the predetermined size is contained in the plurality of the blocks, replacing said block having the different size by a virtual block, which has a size identical with the predetermined size, transformed values of coordinates of vertexes of said virtual block being then calculated from the transformed values of the coordinates of the vertexes of said block having the different size, ii) previously storing information, which represents a transformed value table, and information, which represents a factor table, in a memory, said transformed value table recording the transformed values of the coordinates of the vertexes with respect to each of the blocks, including said virtual block, said factor table recording vertexes, which have weight factors other than 0, and the weight factors of the vertexes, which have weight factors other than 0, with respect to each of positions in a block, and iii) carrying out the interpolating operation by utilizing only the vertexes, which have weight factors other than 0, and in accordance with the transformed values, which have been recorded in said transformed value table, and the vertexes and their weight factors, which have been recorded in said factor table.

2. A method as defined in claim 1 wherein a vertex data sequence, which is formed by arraying the vertexes of a single block in the adjoining order, is stored in said memory, and each of the vertexes, which have weight factors other than 0, is represented by the number of said vertexes and a pointer indicating a portion in said vertex data sequence, at which said vertexes are arrayed consecutively.

3. An image transforming apparatus, in which a first picture element value of each of picture elements constituting a color image is replaced by a second picture element value that is set to have correspondence to the first picture element value by a predetermined transformation formula, the apparatus comprising:

a transformation means for obtaining information representing coordinates of vertexes of a plurality of blocks, into which a multi-dimensional color space has been divided in units of a block having a predetermined size, carrying out an operation with the transformation formula with respect to the coordinates of each of the vertexes of each block, and thereby calculating transformed values of the coordinates of vertexes of each block, a storage means for storing information representing the transformed values having been calculated by the transformation means, and an interpolating operation means for carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, and thereby calculating the second picture element value, wherein the apparatus further comprises a generation means operating such that, in cases where a block having a size different from the predetermined size is contained in the plurality of the blocks, said generation means may replace said block having the different size by a virtual block, which has a size identical with the predetermined size, and said generation means may then generate transformed values of coordinates of vertexes of said virtual block from the transformed values of the coordinates of the vertexes of said block having the different size, the storage means stores information, which represents a transformed value table, and information, which represents a factor table, said transformed value table recording the transformed values of the coordinates of the vertexes with respect to each of the blocks, including said virtual block, said factor table recording vertexes, which have weight factors other than 0, and the weight factors of the vertexes, which have weight factors other than 0, with respect to each of positions in a block, and the interpolating operation means carries out the interpolating operation by utilizing only the vertexes, which have weight factors other than 0, and in accordance with the transformed values, which have been recorded in said transformed value table stored in the storage means, and the vertexes and their weight factors, which have been recorded in said factor table stored in the storage means.

4. An apparatus as defined in claim 3 wherein the storage means further stores information representing a vertex data sequence, which is formed by arraying the vertexes of a single block in the adjoining order, and stores the information representing each of the vertexes, which have weight factors other than 0, as a combination of the number of said vertexes and a pointer indicating a portion in said vertex data sequence, at which said vertexes are arrayed consecutively.

5. A recording medium, on which a program for causing a computer to execute image transformation processing has been recorded, the image transformation processing being carried out for replacing a first picture element value of each of picture elements, which constitute a color image, by a second picture element value that is set to have correspondence to the first picture element value by a predetermined transformation formula, the image transformation processing comprising:

a first step for dividing a multi-dimensional color space into a plurality of blocks in units of a block having a predetermined size, carrying out an operation with the transformation formula with respect to coordinates of each of vertexes of each block, and thereby calculating transformed values of the coordinates of vertexes of each block, and a second step for carrying out an interpolating operation with respect to the first picture element value and in accordance with weight factors of the vertexes, which weight factors are determined in accordance with a position of the first picture element value in a block, and the transformed values of the coordinates of the vertexes of the block, which contains the first picture element value, and thereby calculating the second picture element value, the first picture element value being replaced by the second picture element value, image transformation being thereby carried out, wherein the improvement comprises:

i) in the first step, in cases where a block having a size different from the predetermined size is contained in the plurality of the blocks, replacing said block having the different size by a virtual block, which has a size identical with the predetermined size, transformed values of coordinates of vertexes of said virtual block being then calculated from the transformed values of the coordinates of the vertexes of said block having the different size, ii) previously storing information, which represents a transformed value table, and information, which represents a factor table, in a memory, said transformed value table recording the transformed values of the coordinates of the vertexes with respect to each of the blocks, including said virtual block, said factor table recording vertexes, which have weight factors other than 0, and the weight factors of the vertexes, which have weight factors other than 0, with respect to each of positions in a block, and iii) in the second step, carrying out the interpolating operation by utilizing only the vertexes, which have weight factors other than 0, and in accordance with the transformed values, which have been recorded in said transformed value table, and the vertexes and their weight factors, which have been recorded in said factor table.

6. A recording medium as defined in claim 5 wherein a vertex data sequence, which is formed by arraying the vertexes of a single block in the adjoining order, is stored in said memory, and each of the vertexes, which have weight factors other than 0, is represented by the number of said vertexes and a pointer indicating a portion in said vertex data sequence, at which said vertexes are arrayed consecutively.

* * * * *